United States Patent [19]

Brogli

[11] Patent Number: 4,792,060
[45] Date of Patent: Dec. 20, 1988

[54] DISPOSABLE OR REUSABLE CONTAINER FOR FLOWABLE MATERIAL

[76] Inventor: Werner F. Brogli, Im Oberen Letten, CH-4202, Duggingen, Switzerland

[21] Appl. No.: 888,530

[22] Filed: Jul. 21, 1986

[30] Foreign Application Priority Data

Jul. 22, 1985 [DE] Fed. Rep. of Germany ....... 3526113

[51] Int. Cl.$^4$ ............................................. B65D 35/08
[52] U.S. Cl. .................................. 222/107; 222/541; 206/628
[58] Field of Search ............... 222/107, 206, 212, 215, 222/420, 421, 541; 206/484, 601, 604, 608–609, 610, 612, 620, 628, 634; 229/7 R, 41 R, 43

[56] References Cited

U.S. PATENT DOCUMENTS

| 1,661,564 | 3/1928 | Ebbesen | 222/107 X |
| 3,951,313 | 4/1976 | Coniglione | 222/186 |
| 4,248,227 | 2/1981 | Thomas | 128/232 |
| 4,463,867 | 8/1984 | Nagel | 220/270 |
| 4,502,616 | 3/1985 | Meierhoefer | 222/215 |
| 4,634,008 | 1/1987 | Strole et al. | 206/628 |

FOREIGN PATENT DOCUMENTS

| 8127806 | 2/1982 | Fed. Rep. of Germany. |
| 3143671 | 5/1983 | Fed. Rep. of Germany. |
| 495888 | 10/1970 | Switzerland. |

Primary Examiner—Michael S. Huppert
Attorney, Agent, or Firm—Lerner, David, Littenberg, Krumholz & Mentlik

[57] ABSTRACT

A disposable or reusable container for flowable products in powdered, granular or liquid form which consists of a single blank made of stiff but flexible coated carton material whose side wall segments are provided with flanges on the side edges which are joined to form a fluid tight connection with, at least at one location of the superimposed flanges, provides a discharge opening which extends into a separable tongue normally closed before use and which is connected with the blank as a unitary piece. In order to facilitate tearing off the separable tongue from the container by for example handicapped persons or others under unusual or unfavorable circumstances the separable tongue is shaped so as to provide an enlarged gripping flange at least as large in width as the container. Additionally, to facilitate the tearing off of this separable tongue from the container and to reduce the tearing forces necessary for this purpose, assistance is provided by scoring the wall between the container and the separable tongue. Additional assistance for exerting manual force is provided by at least one or more finger holes in the enlarged gripping flange formed by the separable tongue. The disposable and reusable container as above described also having a scored inner wall to facilitate controlling the dispensing of the flowable products therefrom.

3 Claims, 1 Drawing Sheet

DISPOSABLE OR REUSABLE CONTAINER FOR FLOWABLE MATERIAL

BACKGROUND OF THE INVENTION

This invention relates to disposable or reusable containers for flowable products, for example products in powdered, granular or liquid form which containers are made from a single stiff but flexible flat blank of coated carton material formed by using a shaped blank which is folded on itself to form an inwardly bulging center section or bottom and oppositely bulging side sections which are joined on their opposite edges and flanges to form a fluid tight connection and in such a manner that at least at one location the superimposed side edges and flanges provide spaced coacting walls defining a discharge opening extending into a separable tongue normally closed which can be torn or cut to define a dispensing outlet for dispensing the flowable products stored in a given disposable or reusable container.

Such containers are known in the prior art as is shown in DE OS No. 31 43 671. These containers have been successful either as disposable containers or as reusable containers where only a portion of the flowable product is dispensed from time to time.

For persons handicapped with manual or hand problems who need to utilize the flowable products in such containers, for example as a medicament or under conditions which require that the container be opened relatively rapidly for example, when the container contains a special drink for an athlete which must be consumed while the athlete is running in a race or otherwise, the prior art containers are not suitable, or are suitable only to a limited extent because the relatively small separable tongue on such containers require a certain degree of skill and force in order to form the dispensing outlet for the container an this is true even when notches are provided to assist tearing off of the separable tongue on such containers. Handicapped persons or athletes participating in running events do not have the required skill and force necessary to meet the requirements of tearing the prior art tongues in order to establish the dispensing outlet for the containers.

Further, the assistance of a tool such as a pair of scissors cannot be used by the handicapped persons or is not readily available to an athlete in a running event.

Comparable containers are known in the prior art which are provided with a decanting outlet having a screw or the like type of cap as a closure member for such decanting outlet. However, even with such prior art devices the problem is the same for persons with manual handicaps because very often they cannot open such a screw cap or the like closure or can only open the same with great difficulty. Further, however, such an additional closure means increases the cost of manufacture and renders such containers expensive so that they are not suitable commercially as disposable containers.

SUMMARY AND OBJECTS OF THE INVENTION

The present invention overcomes these problems of the prior art and accomplishes the above object by providing a separable tongue in the form of an enlarged gripping flange in the area of the discharge outlet end of the separable tongue on the container, as a function of the width of the discharge outlet in the separable tongue and/or the size of the side edges or flanges for the given container. This structure overcomes and eliminates the main problems of the prior art containers which have relatively small, separable tongues thereon which slip out of the hands of handicapped people due to the dexterity and force that must be exerted in order to tear the separable tongue to provide the dispensing outlet for such prior art container.

The separable tongue for the container in accordance with the present invention has a sufficiently large gripping section that can be gripped on the enlarged surface area thereof or can be held at the outer edges to enable the required tearing forces to be exerted for tearing off the separable tongue even under unfavorable conditions.

This unique idea of increasing the surface area of the separable tongue to form the dispensing outlet does not make the separable tongue any more conspicuous but provides a considerably enlarged flange section for the separable tongue. Such variation in the construction of the separable tongue does not increase the cost of the container because it is only necessary to modify the blank from which the container is made. Further, this enlarged tongue may be formed unitarily with the side edges and flanges of the container similar to the manner in which such separable tongues have been heretofore made on the prior art devices.

An improved embodiment which is particularly advantageous for the improved separable tongue in accordance with the present invention is to provide tear off assistance at the opening or separating location between the enlarged gripping flange and the container. Thus, the force required for tearing the separable tongue from the container can be further lowered.

Another advantageous embodiment of the invention may consist in means for providing gripping assistance in the form of at least one finger hole in the enlarged gripping flange for the separable tongue. This enables people who have manual or finger handicaps due to distortion or gout wherein the fingers are practically immovable to easily tear the separable tongue so as to provide the dispensing outlet for the improved containers in accordance with the present invention.

It is advantageous when a finger hole is so provided in the enlarged gripping flange formed by the separable tongue, to position the finger hole eccentrically with respect to the longitudinal centerline of the container so that it can be gripped and pulled obliquely with respect to such centerline for the container and thus facilitate tearing off of the separable tongue to form the dispensing outlet.

The lateral or transverse dimension for the enlarged gripping flange for the separable tongue may correspond approximately to the width of the container and is preferably disposed transversely to the discharge opening extending into the separable tongue so that the discharge outlet end of the container will be a T-shaped in side elevation. This can be easily established by shaping the blank to provide this position and the desired dimensions for the enlarged gripping section formed by the separable tongue.

The enlarged gripping section enables the user to manually grasp this uniformly wide part which can be easily separated by exerting the usual tearing movement in order to form the dispensing outlet for the container.

The side edges or flanges of the container which are disposed in the plane of the separable tongue are tapered adjacent to the side edges or flanges of the separable tongue in the area of the enlarged gripping flange so that acute angled notches are formed to provide tear off assistance. These notches are located on opposite sides of the discharge opening for the container extending into the longitudinally projecting separable tongue for the disposable and reusable container in accordance with the present invention.

The disposable and reusable container sides are tapered away from the area where the dispensing outlet will be formed. Since the enlarged gripping section formed by the separable tongue has the same width as the container, one obtains the smallest tear off area at the point where the dispensing outlet for the container is formed. This construction while weakened is initially fluid tight and will remain fluid tight even after the dispensing outlet is formed when the container is not in use because the total size of the dispensing outlet is relatively small and the nature of the material tends to maintain the container sealed.

The construction where the discharge outlet of the disposable and reusable container in accordance with the present invention extends into the area of the enlarged gripping section formed by the separable tongue serves to ensure the operation of the dispensing outlet after the separable tongue is torn to form such dispensing outlet.

The present invention in order to assure controlled dispensing for example of powder or granular material such as a medicament, may also be scored in the sidewalls which define the discharge outlet for the container which extends into the separable tongue for the container. Such scoring is formed in the surface of the inner wall and generally extends parallel to the longitudinal line of the container and acts to facilitate the spreading apart of the dispensing outlet formed after the separable tongue is torn. In this position the scoring on the inner wall also serves as a guide conduit through which the flowable product in the container can be discharged in a concentrated manner during squeezing or decanting of the container. Thus, even a handicapped person is able to dispense the flowable product easily or decant the same into a suitable vessel such as a glass.

Scoring can also be provided at the point where the dispensing outlet for the container is formed during tearing of the separable tongue so as to weaken the oppositely disposed side walls which define the discharge opening in the separable tongue for the container. Such scoring for weakening the sidewalls is disposed transversely of the longitudinal line of the container.

This wall weakening scoring is provided to reduce the forces necessary for tearing the separable tongue so as to form the dispensing outlet for the container.

Thus, for those containers wherein the two forms of scoring are provided, one transversely to the discharge outlet and the other disposed parallel to the longitudinal line of the discharge outlet, these scorings will be T-shaped with respect to each other. Further, the scoring which is disposed parallel to the discharge outlet will provide a decanting or discharge direction for the flowable product being discharged from the container which is approximately perpendicular to the dispensing outlet formed by tearing off the separable tongue as has been described.

When all of the foregoing features are taken alone or in combination with each other it will be clear that a disposable and reusable container having an improved separable tongue is provided which can be manufactured at a relatively low cost but which provides the intended object for manually handicapped persons or enables the container to be used under unusual or even unfavorable conditions so that the separable tongue can be easily torn to enable the contents of such disposable and reusable containers to be dispensed.

This advantageous result is accomplished by providing an enlarged tear off section for the separable tongue which in plan view is considerably larger than the conduit for which a dispensing outlet is formed which enlarged tear off section can be easily gripped even under the most unfavorable circumstances so as to enable the required tearing off forces to be easily and comfortably applied for forming the required dispensing outlet for the disposable and reusable container.

It is therefore an object of the present invention to provide a container of the above mentioned type which can be easily and rapidly torn open without tools even by persons with handicaps or under unfavorable circumstances at a given or predetermined location.

This invention will now be explained in detail by reference to the accompanying description taken in conjunction with the drawings in which:

DESCRIPTION OF THE PREFERRED EMBODIMENTS OF THE INVENTION

Figure 1:
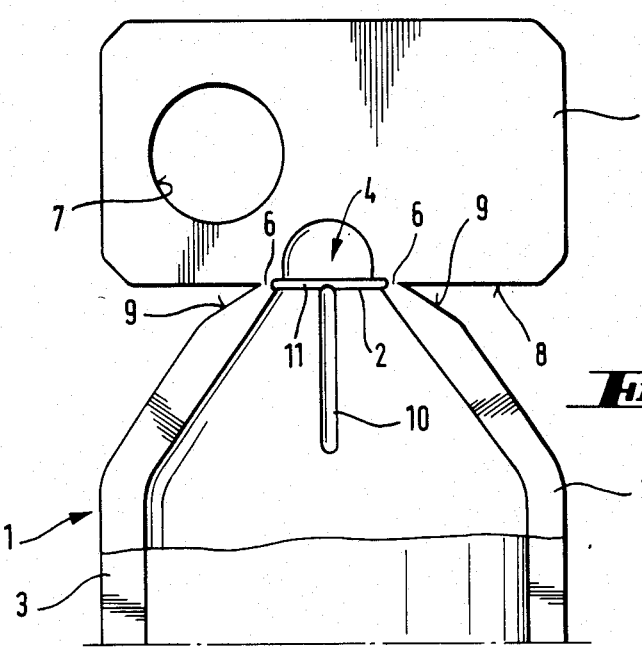
FIG. 1 is a side elevational view of the dispensing outlet or separable tongue end of a disposable or reusable container in accordance with the present invention showing the enlarged tear off section for the separable tongue having an eccentrically disposed finger hole for aiding the tearing action.
Figure 2:
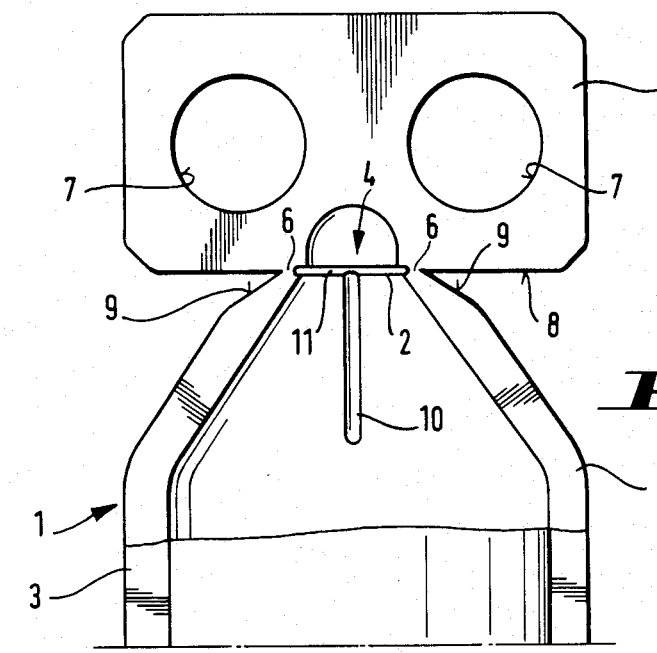
FIG. 2 is a side elevation of a second embodiment of a disposable or reusable container in accordance with the present invention similar to the form of the invention shown in FIG. 1 wherein the enlarged tear off section for the separable tongue has two eccentrically disposed finger holes therein.

Referring to the drawings FIGS. 1 and 2 show a disposable or reusable container generally designated 1 in accordance with the present invention taken at the dispensing outlet 2, which container 1 is charged with the flowable product in powdered, granular or liquid form.

This container 1 will be made from a single stiff but flexible flat blank of coated carton material so that it is sufficiently strong to hold the contents thereof but after the dispensing outlet 2 is formed permits by squeezing or decanting the discharge of the flowable product held in the container. The coated carton material blank is formed so as to provide a bulging bottom or central section, not shown in the drawings, and bulging oppositely disposed side wall sections which are joined or sealed on their side edges b connecting the edge flanges 3 as will be understood by those skilled in the art. The flanges are so joined that at least at one point a discharge opening 4 extends through the point where the dispensing outlet 2 will be formed. Discharge opening 4 is disposed to extend into the initially or normally closed separable tongue generally designated 5 and therefore will be in communication and continuous with the dispensing outlet 2 formed in the container 1, as will now be described.

In order to facilitate the tearing off of the separable tongue 5 even under the most unfavorable conditions, for example by an athlete while in a running contest or by someone having a manual handicap without the necessity of using a tool, the separable tongue 5 is shown as having a considerably enlarged area about the discharge opening 4 for the container 1 with respect to the transverse dimension of the discharge opening 4 and the dimensions of the connected side flanges 3, to the extent that the separable tongue not only functions initially to keep the discharge outlet closed but serves to provide the enlarged gripping flange which can be comfortably gripped and torn off even under the most unfavorable conditions because heavy arm or manual leverage forces can be applied to produce the desired tearing forces necessary for tearing the separable tongue to form the dispensing outlet 2.

It is also possible to facilitate the tearing off action by providing means which reduces the required tearing forces even further and this will be described in more detail below.

In both of the illustrated embodiments as shown in FIGURES 1 and 2 of the drawings, the enlarged gripping flange formed by the separable tongue 5 is provided with means to improve the manual gripping engagement which in the respective illustrated embodiments are represented by the finger holes designated 7 in each of the illustrated embodiments of the invention.

Finger holes 7 are eccentrically disposed in the enlarged gripping flange formed by the separable tongue 5 so that they lie on either or both respective sides of the longitudinal centerline of the container 1.

By introducing a finger or fingers into either or both of the finger holes 7, a corresponding manual tearing force can be applied in a direction transverse to the dispensing outlet 2 formed in the container 1 when the torn off portion of the separable tongue is removed.

It is preferable to provide the two eccentrically disposed finger holes as at 7 in accordance with the form of the invention shown at FIG. 2 because it is easy for the fingers to locate either or both of the holes quickly when using the disposable or reusable container in accordance with the present invention.

In both of the illustrated embodiments of the disposable or reusable containers in accordance with the present invention, it will be noted that the transverse dimension of the enlarged gripping flange formed by the separable tongue 5 corresponds to about the width of the container 1 and is so disposed with respect to the discharge opening 4 extending through the dispensing outlet 2 that the container is T-shaped in side elevation.

Assistance also is provided for obtaining the desired tearing forces necessary to separate the separable tongue 5 from the container 1 by forming the edge flanges 3 in the same plane as the enlarged separable tongue 5 and at the point where the separable tongue 5 connects to the discharge opening end of the container 1, the flanges are formed to converge or taper towards the adjacent edge 8 of the separable tongue 5 so that between this end of the container 1 and the adjacent enlarged separable tongue 5 acute angled notches are formed on opposite sides of the container. These notches are made even more sensitive by providing oblique cuts as at 9 in the adjacent edges of the side flanges 3 for the container 1. This aids and reduces the required tearing forces, as compared to the case where if the edge flanges 3 are maintained at the same width as the point of connection with the enlarged gripping flange formed by the separable tongue all of which is clearly shown in FIGS. 1 and 2 of the drawings.

Further FIGS. 1 and 2 show that this construction enables the formation of a relatively small dispensing outlet to be formed on the one hand and also provide a reduction in the tearing forces required on the other hand.

It will also be clear from the above description and FIGS. 1 and 2 of the drawings that after the separable tongue 5 has been torn that a tapered or conically shaped dispensing outlet 2 is formed due to the tapered shape of the edge flanges 3 for the container 1. This tapered or conical dispensing outlet 2 acts to concentrate the flowable products being dispensed from the container 1 during the use thereof. Thus, the tapered or conically shaped design for this portion of the container 1 with respect to the enlarged gripping flange formed by the separable tongue has a dual function.

FIGS. 1 and 2 also show as previously noted, that the discharge outlet 4 partially extends into the separable tongue 5 so that after the separable tongue is torn from the container 1, the container will provide the desired dispensing outlet 2 at this end of the container 1.

FIGS. 1 and 2 further show means which facilitates the controlled dispensing of powdered, granular or liquid materials by for example, handicapped persons. Thus, in the dispensing outlet end of the container 1, at least one first groove or score is provided as at 10 in the sidewall of the container 1 generally parallel to the longitudinal line of the discharge outlet and the container. This first groove or scored section 10 acts to spread apart the dispensing outlet 2 generated after tee tearing off of the separable tongue 5 whereby a guide conduit is formed when the dispensing outlet is forced from the normally closed or sealed position to an open position.

At least one second groove or score as at 11 is also formed transversely of the discharge opening at the approximate point where the container 1 meets the enlarged gripping flange formed by the separable tongue 5 which serves to weaken the respective opposite walls of the container at a point where the walls are not connected with each other in contrast to the edge flanges 3 and separable tongue 5. Thus, tearing of the separable tongue 5 is easily accomplished at this point and the later discharging of the flowable products in the container is not impaired due to any adherence of the walls to each other.

Preferably, the first groove or scoring 10 which forms the guide conduit and the second groove or scoring 11 which facilitates and reduces the forces necessary to tear the separable tongue from the container are disposed so that the first groove or scoring 10 is perpendicular or normal to the second groove or scoring 11.

It will be understood that the invention is not to be limited to the specific construction or arrangement of parts shown but that they may be widely modified within the invention defined by the claims.

What is claimed is:

1. A disposable and reusable container for flowable products in powdered, granular, liquid or other form, made from a single stiff but flexible blank of coated carton material which is formed by inwardly bulging a center section of the initially flat blank, and simultaneously raising and outwardly bulging oppositely disposed side sections of the flat blank and connectedly superimposing the side edges and flanges thereof so that at least at one location the superimposed side edges and flanges form at least one discharge opening which communicates with a normally closed separable tongue, characterized in that:
- a. said separable tongue is enlarged to form a gripping flange means in the area of the discharge opening for the container,
- b. said enlarged gripping flange means is formed with respect to the discharge opening width and the width of the superimposed flanges,
- c. said enlarged gripping flange means includes at least one fingerhole therein to assist in separating the separable tongue from the container, and
- d. at least one first groove is provided generally parallel to the longitudinal line of the container in at least one of the raised and outwardly bulging oppositely disposed side sections to facilitate the emptying of the container during use thereof.

2. The container in accordance with claim 1, characterized in that another groove is formed transversely to the longitudinal line of the container at the point of separation between the container and the separable tongue to reduce the tearing forces required for tearing off the separable tongue.

3. The container in accordance with claim 2, characterized in that the at least one first groove extended parallel to the longitudinal line of the container is disposed at approximately right angles to the at least another groove for reducing the tearing forces.

* * * * *